US012767579B2

(12) United States Patent
Shiratsuchi

(10) Patent No.: US 12,767,579 B2
(45) Date of Patent: Oct. 20, 2026

(54) APPARATUS FOR MANUFACTURING OPTICAL FIBER PREFORM AND METHOD FOR MANUFACTURING OPTICAL FIBER PREFORM

(71) Applicant: FURUKAWA ELECTRIC CO., LTD., Tokyo (JP)

(72) Inventor: Kazutoshi Shiratsuchi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 114 days.

(21) Appl. No.: 18/365,511

(22) Filed: Aug. 4, 2023

(65) Prior Publication Data

US 2023/0373843 A1 Nov. 23, 2023

Related U.S. Application Data

(63) Continuation of application No. PCT/JP2022/003273, filed on Jan. 28, 2022.

(30) Foreign Application Priority Data

Feb. 8, 2021 (JP) ................................ 2021-018514

(51) Int. Cl.
*C03B 37/014* (2006.01)

(52) U.S. Cl.
CPC .... *C03B 37/0142* (2013.01); *C03B 37/01493* (2013.01)

(58) Field of Classification Search
None
See application file for complete search history.

(56) References Cited

U.S. PATENT DOCUMENTS

| | | | | |
|---|---|---|---|---|
| 4,568,370 | A | 2/1986 | Powers | |
| 2004/0060326 | A1 * | 4/2004 | Ishihara ............ | C03B 37/01486 65/421 |
| 2016/0176749 | A1 | 6/2016 | Terashima et al. | |
| 2019/0112218 | A1 | 4/2019 | Otosaka | |

(Continued)

FOREIGN PATENT DOCUMENTS

| | | | |
|---|---|---|---|
| JP | 59-78945 | A | 5/1984 |
| JP | 62-202832 | A | 9/1987 |
| JP | 4-78226 | U | 7/1992 |

(Continued)

OTHER PUBLICATIONS

JP2001019439 machine translation, Fukuda et al., Production of Accumulated Body of Fine Particles of Glass, Jan. 2001 (Year: 2001).*

(Continued)

*Primary Examiner* — Queenie S Dehghan
(74) *Attorney, Agent, or Firm* — Oblon, McClelland, Maier & Neustadt, L.L.P.

(57) ABSTRACT

An apparatus for manufacturing an optical fiber preform, the apparatus including: a reaction vessel in which an initial substrate is arranged; a burner that can be inserted from an opening of the reaction vessel to spray a glass soot on the initial substrate in the reaction vessel; and a sealing member that has an internal space for accommodating the burner, and is extendable in accordance with a position of the burner and airtightly connects the opening and the internal space.

7 Claims, 9 Drawing Sheets

(56) References Cited

U.S. PATENT DOCUMENTS

2020/0156988 A1 5/2020 Nagashima

FOREIGN PATENT DOCUMENTS

| | | | |
|---|---|---|---|
| JP | 7-119876 | A | 5/1995 |
| JP | 8-78300 | A | 3/1996 |
| JP | 9-188523 | A | 7/1997 |
| JP | 10-167747 | A | 6/1998 |
| JP | 2001-287923 | A | 10/2001 |
| JP | 2004-183670 | A | 7/2004 |
| JP | 2014-9142 | A | 1/2014 |
| JP | 2016-117616 | A | 6/2016 |
| JP | 2019-73406 | A | 5/2019 |
| JP | 2020-83675 | A | 6/2020 |

OTHER PUBLICATIONS

JP 2003-073131 machine translation, Ishihara Tomohiro, Method for Producing Glass Microparticle Deposit, Mar. 2003 (Year: 2003).*

Japan Office Action issued Oct. 10, 2024 in Japanese Patent Application No. 2021-018514, 10 pages (with English language translation).

International Search Report issued Apr. 5, 2022 in PCT/JP2022/003273 filed on Jan. 28, 2022, 3 pages.

* cited by examiner

APPARATUS FOR MANUFACTURING OPTICAL FIBER PREFORM AND METHOD FOR MANUFACTURING OPTICAL FIBER PREFORM

CROSS-REFERENCE TO RELATED APPLICATIONS

This application is a Continuation of International Patent Application No. PCT/JP2022/003273, filed Jan. 28, 2022, which claims the benefit of Japanese Patent Application No. 2021-018514, filed Feb. 8, 2021, both of which are hereby incorporated by reference herein in their entirety.

BACKGROUND OF THE INVENTION

Field of the Invention

The present invention relates to an apparatus for manufacturing an optical fiber preform and a method for manufacturing the optical fiber preform.

Description of the Related Art

Japanese Patent Laid-Open No. 2014-9142 discloses a VAD apparatus for producing an optical fiber preform by depositing glass soot ejected from a burner on the outer periphery of the initial substrate in a reaction vessel.

SUMMARY OF THE INVENTION

If there is a gap between the burner and the reaction vessel in the VAD apparatus, foreign substance in the outside air may be caught in the reaction vessel through the gap and the foreign substance may be introduced into the glass soot. If the sintering process is carried out to make an optical fiber preform in this state, air bubbles are generated from the foreign substance as the starting point. The air bubbles cause disconnection of the optical fiber when the preform is stretched to make the optical fiber.

In addition, as the deposition of the glass soot progresses, the distance between the burner and the optical fiber preform becomes narrow. However, when the distance between the burner and the optical fiber preform changes, the quality of the deposited glass soot also changes.

In response to the problems, the device in Japanese Patent Laid-Open No. 2014-9142 has a structure in which the position of the burner can be adjusted while ensuring airtightness by filling the gap between the reaction vessel and the burner with a V-shaped sealing member. However, in the device, in order to move the burner, it is necessary to insert and remove the burner between the sealing members or tilt the burner. If a small gap exists in the sealing member when adjusting the position of the burner, the gap may reduce the airtightness in the reaction vessel.

In view of the above problems, the present invention intends to provide an apparatus and a method for manufacturing an optical fiber preform that can freely adjust the position of the burner while ensuring airtightness in the reaction vessel.

According to an aspect of the present invention, there is provided an apparatus for manufacturing an optical fiber preform, the apparatus including: a reaction vessel in which an initial substrate is arranged; a burner that can be inserted from an opening of the reaction vessel to spray a glass soot on the initial substrate in the reaction vessel; and a sealing member that has an internal space for accommodating the burner, and is extendable in accordance with a position of the burner, and airtightly connects the opening and the internal space.

According to another aspect of the present invention, there is provided a method for manufacturing an optical fiber preform including: a step of placing an initial substrate in a reaction vessel; a step of airtightly connecting an opening of the reaction vessel and the internal space, with a sealing member that has an internal space for accommodating the burner and is extendable in accordance with a position of the burner; a step of spraying a glass soot against the initial substrate from the burner inserted through the opening; and a step of adjusting a distance between the burner and the initial substrate.

According to the present invention, it is possible to provide an apparatus and a method for manufacturing an optical fiber preform that can freely adjust the position of the burner while ensuring airtightness in the reaction vessel.

DESCRIPTION OF THE EMBODIMENTS

Embodiments according to the present invention will be described below with reference to the drawings. Throughout the drawings, components having the same function are labeled with the same references, and the repetitive description thereof will be omitted.

First Embodiment

Figure 1:
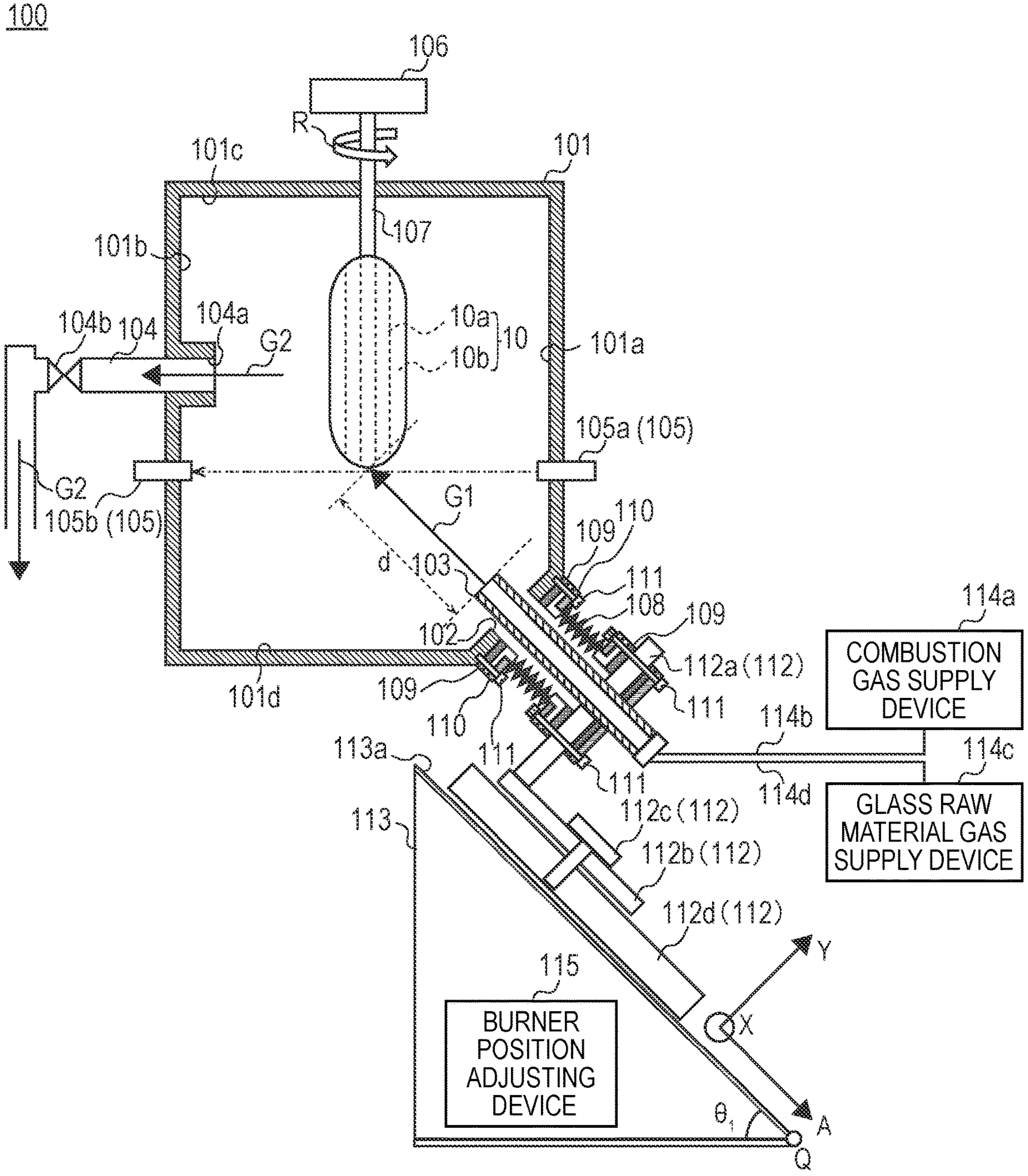
FIG. 1 is a schematic cross-sectional view illustrating an overall configuration of a manufacturing apparatus according to a first embodiment.
Figure 2:
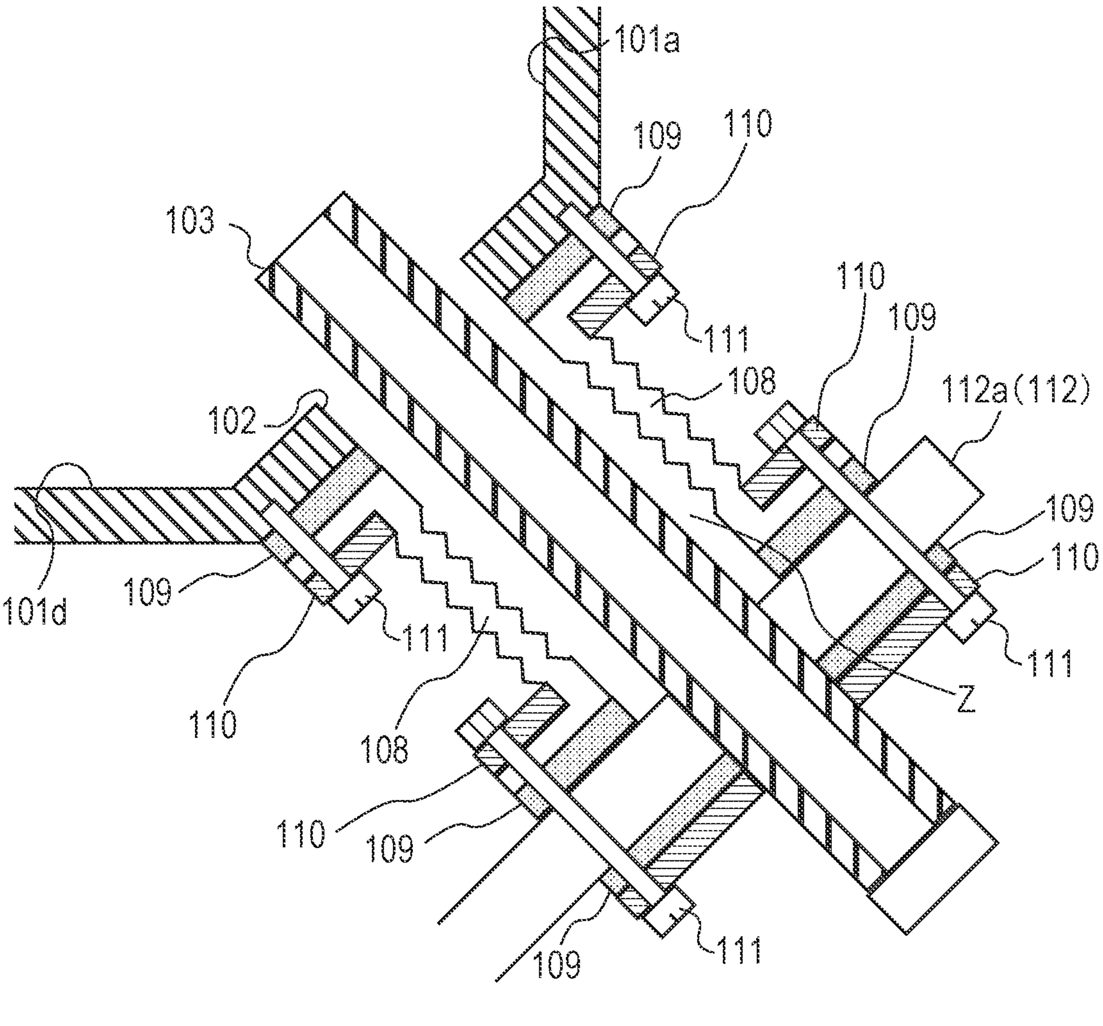
FIG. 2 is an enlarged cross-sectional view illustrating a supporting structure and sealing structure of a burner in the manufacturing apparatus according to the first embodiment.

FIG. 1 is a schematic cross-sectional view illustrating an overall configuration of a manufacturing apparatus 100 according to the present embodiment. FIG. 2 is an enlarged cross-sectional view illustrating the supporting structure and sealing structure of a burner 103 in the manufacturing apparatus 100 according to the present embodiment.

As illustrated in FIG. 1, the manufacturing apparatus 100 is equipped with a reaction vessel 101, a burner 103, and an exhaust mechanism 104. The burner 103 is arranged so as to protrude toward the inside of the reaction vessel 101 from an opening 102 provided on an inclined surface extending over a side wall 101*a* and a bottom 101*d* of an air supply side of the reaction vessel 101. The exhaust mechanism 104 is provided through an exhaust port 104*a* provided on a side wall 101*b* (the side wall 101*b* on the exhaust side) facing the side wall 101*a*.

The exhaust mechanism 104 has a pump (not illustrated) and a valve 104*b*. The exhaust mechanism 104 drives the pump in accordance with instructions from a control unit 200 described later. Thereby, the exhaust mechanism 104 can form a flow of gas (exhaust gas G2) from the air supply side (opening 102) of the reaction vessel 101 toward the exhaust side (exhaust port 104*a*) and exhaust the inside of the reaction vessel 101.

In addition, the manufacturing apparatus 100 is equipped with a rotation and elevation mechanism 106 on a side of a ceiling 101*c* of the reaction vessel 101. The rotation and elevation mechanism 106 is connected to a target rod 107 as an initial substrate. The rotation and elevation mechanism 106 rotates the target rod 107 in the rotation direction R with the longitudinal direction of the target rod 107 as the rotation axis in accordance with instructions from the control unit 200 described later. Furthermore, the rotation and elevation mechanism 106 elevates an optical fiber preform 10 by driving the target rod 107 in the vertical direction in accordance with instructions from the control unit 200.

A combustion gas is supplied to the burner 103 from a combustion gas supply device 114*a* via a combustion gas supply line 114*b*, and glass raw material gas (gas for glass particulates due to hydrolysis by combustible) is supplied from a glass raw material gas supply device 114*c* via a glass raw material gas supply line 114*d*.

The combustion gas supply device 114*a* supplies independently the flow-controlled combustion gas to the burner 103 in accordance with instructions from the control unit 200 described later. The combustion gas includes, for example, at least one of, combustible gas such as hydrogen ($H_2$), and combustion-supporting gas such as oxygen ($O_2$).

The glass raw material gas supply device 114*c* supplies the flow-controlled glass raw material gas (For example, $SiCl_4$) to the burner 103 as a raw material for the synthesis of the optical fiber preform in accordance with instructions from the control unit 200 described later.

The burner 103 forms a flame with the combustion gas supplied from the combustion gas supply device 114*a* in accordance with instructions from the control unit 200 described later. The burner 103 hydrolyzes the glass raw material gas supplied from the glass raw material gas supply device 114*c* in the flame to form a glass soot. The burner 103 blows the flame (gas G1) containing the glass fine particles to the target rod 107 to deposit the glass fine particles and form the optical fiber preform 10.

The optical fiber preform (glass soot base material) 10 manufactured in the manufacturing apparatus 100 consists of an inner deposition soot 10*a* formed on the outer periphery of the target rod 107 as the initial substrate and an outer deposition soot 10*b* formed on the outside of the inner deposition soot 10*a*. The inner deposition soot 10*a* corresponds to a core of the optical fiber as a final product. On the other hand, the outer deposition soot 10*b* corresponds to a cladding of the optical fiber.

As illustrated in FIG. 1 and FIG. 2, the burner 103 is arranged so that one end of the burner 103 protrudes from the opening 102 toward the inside of the reaction vessel 101. Also, the burner 103 is supported with the other end side gripped by a holding part 112*a* of the burner supporting member 112. The holding part 112*a* is connected to a plate-like first fixing member 112*b* at the end opposite to the holding position of the burner 103. The first fixing member 112*b* is connected to a plate-like second fixing member 112*d* by a fastening metal fitting 112*c*. The second fixing member 112*d* is mounted on an inclined surface 113*a* of a pedestal 113 parallel to the plane direction of the inclined surface 113*a*.

Inside the pedestal 113, a burner position adjusting device 115 is provided. The burner position adjusting device 115 can adjust the position and angle of the burner 103 by driving the burner supporting member 112 and the inclined surface 113*a* of the pedestal 113. The inclined surface 113*a* of the pedestal 113 is composed of a plate-like member that can be driven around the axis Q independently of the body part of the pedestal 113.

In the present embodiment, the burner position adjusting device 115 drives the burner supporting member 112 in the direction (direction A in the figure) along the inclined surface 113*a*. As a result, the burner 103 moves so that the gas discharge port is in a predetermined position.

In addition, the burner position adjusting device 115 drives the burner supporting member 112 mounted on the inclined surface 113*a* by rotating the plate-like member constituting the inclined surface 113*a* of the pedestal 113 around the axis Q. Thus, the angle formed by the axial direction of the target rod 107 (the direction directly below the lead) and the axial direction of the burner 103 is adjusted. The method of adjusting a distance between the burner 103 and the target rod 107 and an angle of the burner 103 with respect to the target rod 107 in the burner position adjusting device 115 according to the present embodiment is only one example and not limited to this. For example, instead of the inclined surface 113*a* of the pedestal 113 rotating around the axis Q, the burner supporting member 112 may be constructed to rise and fall in the Y direction as a whole.

The sealing member 108 is formed as a whole in an approximately cylindrical shape. The burner 103 is inserted into the internal space of the sealing member 108. The sealing member 108 is formed of a material having heat resistance, airtightness, and elasticity. The material of the sealing member 108 is, for example, synthetic resin, but the material is not limited to this.

In the present embodiment, both ends of the sealing member 108 are formed in a flange-like shape. One end of the sealing member 108 is fixed to the peripheral region of the opening 102 of the reaction vessel 101. One end of the sealing member 108 is fixed to the peripheral region by screwing a fixing screw 111 into the peripheral region with the heat-resistant packing 109 sandwiched between the peripheral region of the opening 102 and a flange 110.

Similarly, the other end of the sealing member 108 is fixed to the holding part 112*a* of the burner supporting member 112. The other end of the sealing member 108 is fixed to the peripheral region by screwing the fixing screw 111 into the holding part 112*a* with the heat-resistant packing 109 sandwiched between the holding part 112*a* and the flange 110. Thus, an internal space Z around the burner 103 is formed in the sealing member 108.

In the present embodiment, the sealing member 108 is formed in a bellow-like shape in the longitudinal direction. Thus, the sealing member 108 can be freely deformed while maintaining airtightness in the internal space Z of the sealing member 108 and in the reaction vessel 101 even when the burner 103 and the burner supporting member 112 are driven in the A or Y direction.

Furthermore, in the present embodiment, the manufacturing apparatus 100 is equipped with a tip detection sensor 105. The tip detection sensor 105 detects that a tip of the optical fiber preform 10 interrupts a laser light. The tip detection sensor 105 includes a laser light emitting unit 105*a* and a laser light receiving unit 105*b*. In the reaction vessel 101, the laser light emitting unit 105*a* is provided on the side wall 101*a*. The laser receiver 105*b* is provided on the side wall 101*b* facing the side wall 101*a*. The laser light emitting unit 105*a* faces the laser light receiving unit 105*b*. According to the instruction from the control unit 200, the laser light emitting unit 105*a* emits the laser toward the laser light receiving unit 105*b*. The laser light receiving unit 105*b* receives the laser emitted from the laser light emitting unit 105*a*.

When a glass soot is deposited more than a certain amount on the surface of the optical fiber preform 10, the laser emitted from the laser light emitting unit 105*a* is blocked by hitting the tip of the optical fiber preform 10. In such a case, since the laser light receiving unit 105*b* can no longer receive the laser, the tip detection sensor 105 outputs a detection signal of the tip of the optical fiber preform 10. Conversely, when the laser irradiated from the laser light emitting unit 105*a* reaches the laser light receiving unit 105*b* opposite to the laser light emitting unit 105*a*, the tip detection sensor 105 does not output a detection signal of the tip of the optical fiber preform 10. In other words, the tip of the optical fiber preform 10 functions as an obstacle that interrupts the laser.

Figure 3:
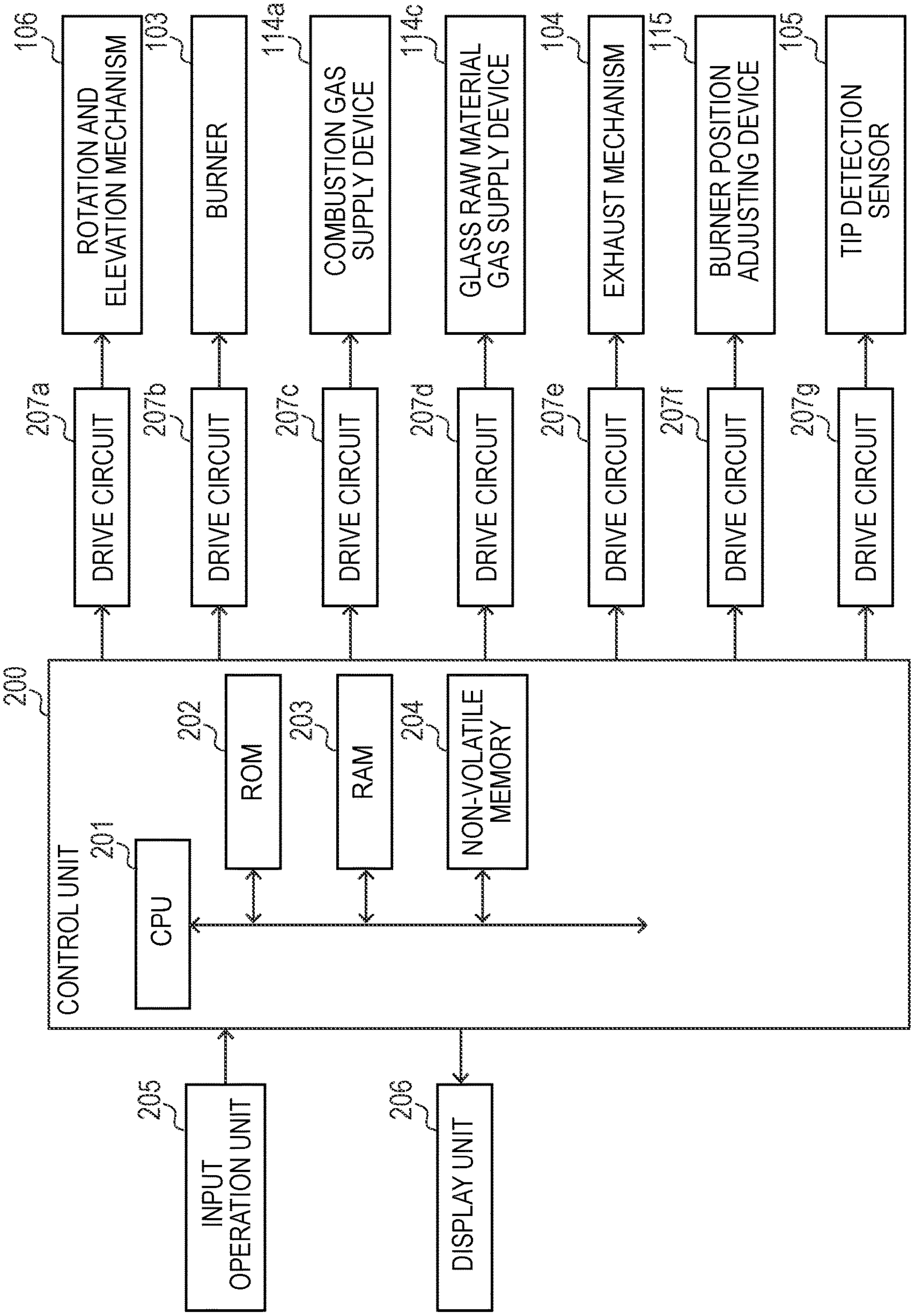
FIG. 3 is a block view illustrating a schematic configuration of a control system of the manufacturing apparatus according to the first embodiment.

FIG. 3 is a block view illustrating a schematic configuration of a control system of the manufacturing apparatus according to the present embodiment. The control unit 200 has a central processing unit (CPU) 201 for executing various processing operations such as operation, control, and determination, and a read only memory (ROM) 202 for storing various control programs and the like executed by the CPU201. The control unit 200 also has a random access memory (RAM) 203 for temporarily storing data during processing operations of the CPU201, input data and the like, and a non-volatile memory 204 such as a hard disk drive (HDD) or a solid state drive (SSD).

The control unit 200 is connected to an input operation unit 205 including a keyboard or various switches for inputting predetermined commands or data and a display unit 206 (For example, liquid crystal displays and OLED displays) for performing various displays including the input and setting states of the manufacturing apparatus 100.

The control unit 200 is connected to a rotation and elevation mechanism 106, the burner 103, the combustion gas supply device 114*a*, the glass raw material gas supply device 114*c*, the exhaust mechanism 104, a burner position adjusting device 115 and a tip detection sensor 105 via drive circuits 207*a* to 207*g*, respectively.

The operation of the manufacturing apparatus 100 constructed as described above will be described below with reference to the drawings.

Figure 4:
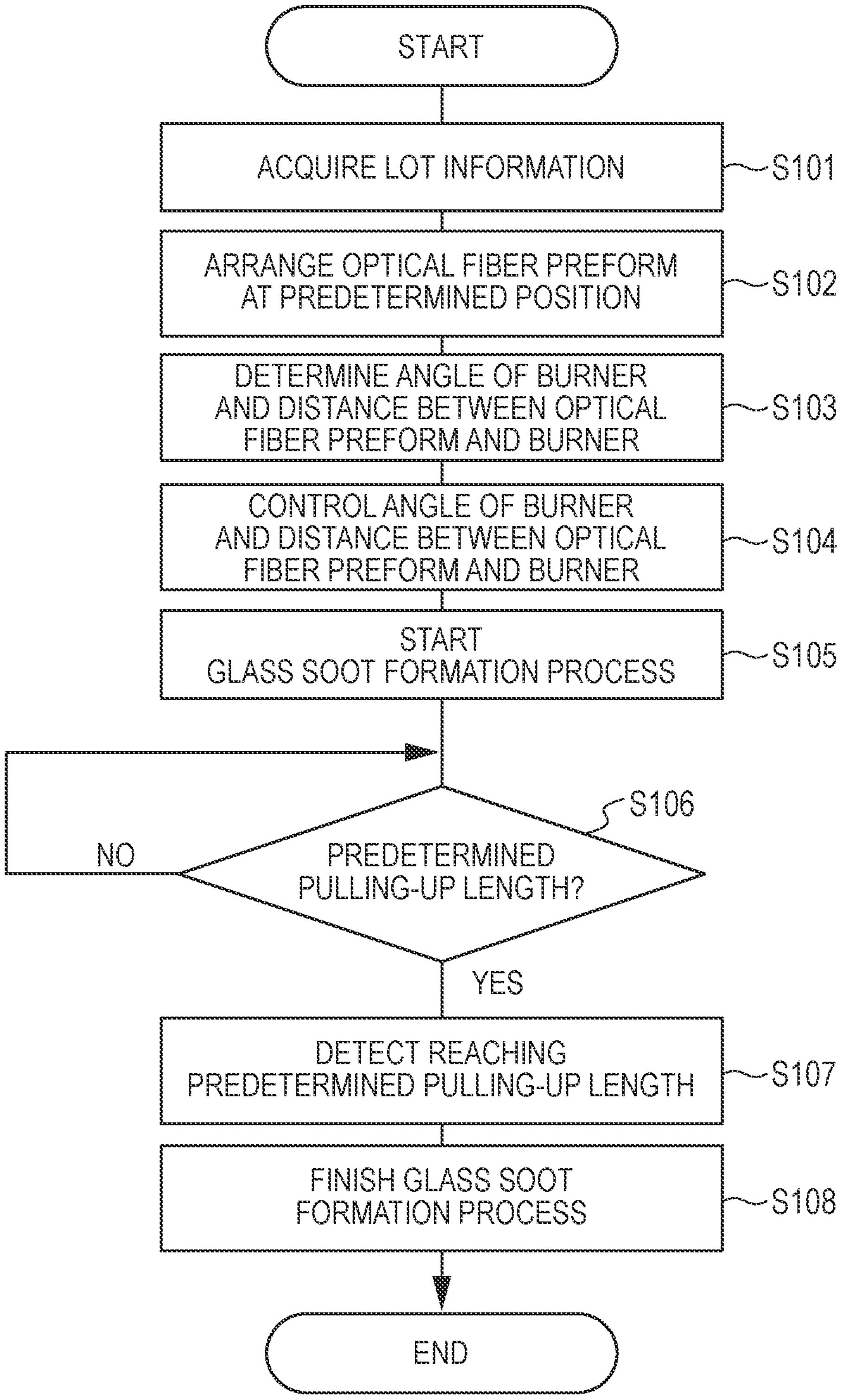
FIG. 4 is a flowchart illustrating an example of a process during a glass soot formation in the manufacturing apparatus according to the first embodiment.

FIG. 4 is a flow chart illustrating an example of a process during glass soot formation in the manufacturing apparatus 100 according to the present embodiment. The process is an example and can be changed freely.

First, the control unit 200 acquires lot information of the optical fiber preform 10 to be manufactured (step S101). The lot information is input from the input operation unit 205.

Next, the control unit 200 controls the rotation and elevation mechanism 106. The rotation and elevation mechanism 106 arranges the optical fiber preform 10 at a predetermined position in the reaction vessel 101 (step S102). For example, when the rotation and elevation mechanism 106 brings the optical fiber preform 10 in the reaction vessel 101 through an upper opening (not illustrated) of the reaction vessel 101, the rotation and elevation mechanism 106 lowers the optical fiber preform 10 in the vessel. Then, the tip detection sensor 105 detects the tip of the optical fiber preform 10. The rotation and elevation mechanism 106 stops the optical fiber preform 10 at a position where the optical fiber preform 10 is moved by a predetermined height.

Figure 5:
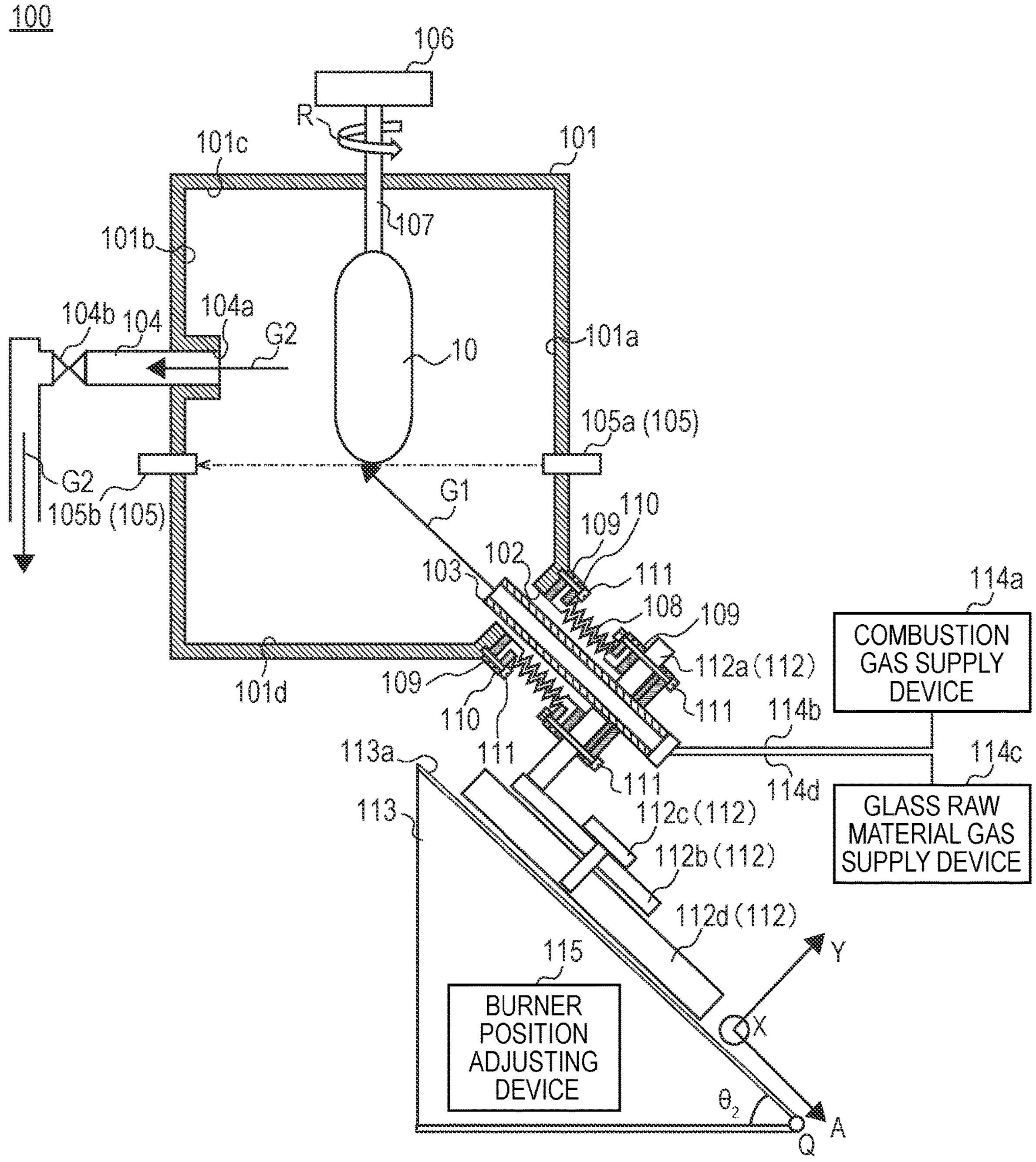
FIG. 5 is a schematic cross-sectional view illustrating the state of the burner before the execution of the position and angle adjustment in the manufacturing apparatus according to the first embodiment.

FIG. 5 is a schematic cross-sectional view illustrating the state of the burner 103 before the execution of the position and angle adjustment in the manufacturing apparatus 100 according to the present embodiment. Here, the tip of the optical fiber preform 10 is arranged at a height not detected by the tip detection sensor 105. However, the direction of the gas discharge port of the burner 103 is inclined downward from the tip of the optical fiber preform 10. In such a case, it is necessary to adjust the position and angle of the burner 103.

Next, the control unit 200 refers to the manufacturing conditions stored in the ROM202 or RAM203 based on the lot information and determines a distance between the optical fiber preform 10 and the burner 103 and an angle of the burner 103 with respect to the optical fiber preform 10 at the start time of the glass soot formation process (step S103).

Next, the control unit 200 controls the burner position adjusting device 115 based on the distance and the angle of the burner 103 determined in the step S103. A position of the burner 103 in the manufacturing apparatus 100 can be determined based on the distance between the optical fiber preform 10 and the burner 103. The burner position adjusting device 115 adjusts the angle of the burner 103 and the distance between the optical fiber preform 10 and the burner 103 (step S104).

FIG. 1 described above illustrates the state after adjusting the position and angle of the burner 103 from the state illustrated in FIG. 5. In FIG. 1, compared with the state in FIG. 5, the burner supporting member 112 is driven along the inclined surface 113*a* of the pedestal 113 so that the gas discharge port of the burner 103 is at a predetermined position.

At the same time, the burner position adjusting device 115 changes the angle of the inclined surface 113*a* of the pedestal 113 by a driving mechanism not illustrated. Since the burner supporting member 112 and the burner 103 provided on the inclined surface 113*a* move, the angle of gas emission in the burner 103 with respect to the optical fiber preform 10 and the target rod 107 is adjusted. For example, in FIG. 1, compared with the state in FIG. 5, the angle of the inclined surface 113*a* of the pedestal 113 is finely adjusted from the angle $\theta_2$ to the angle $\theta_1$. Thus, the angle of the burner 103 is changed so that the gas is supplied to the desired position on the optical fiber preform 10.

Then, the control unit 200 starts the glass soot formation process (step S105). In the glass soot formation process, the control unit 200 controls the rotation and elevation mechanism 106. The rotation and elevation mechanism 106 rotates the target rod 107 in the rotation direction R with the longitudinal direction of the target rod 107 as the rotational axis.

Also, in the glass soot formation process, the control unit 200 controls the combustion gas supply device 114*a*. The burner 103 forms a flame with the combustion gas supplied from the combustion gas supply device 114*a*. The control unit 200 controls the glass raw material gas supply device 114*c*. The burner 103 hydrolyzes the glass raw material gas supplied from the glass raw material gas supply device 114*c* in the flame to form glass fine particles. The burner 103 blows the flame containing these particles to the target rod 107.

Next, the control unit 200 determines whether or not the optical fiber preform 10 has reached a predetermined pulling-up length (step S106). Here, when the control unit 200 determines that the optical fiber preform 10 has reached the predetermined pulling-up length (step S106: YES), the process proceeds to step S107. At this time, the control unit 200 controls the rotation and elevation mechanism 106. The rotation and elevation mechanism 106 can pull up the optical fiber preform 10 to the predetermined position.

On the other hand, when the control unit 200 determines that the optical fiber preform 10 has not reached the predetermined pulling-up length (step S106: NO), the glass soot formation process is continued under the same conditions.

In step S107, the control unit 200 detects that the optical fiber preform 10 has reached the predetermined pulling-up length. At this time, the control unit 200 controls the rotation and elevation mechanism 106. The rotation and elevation mechanism 106 pull up the optical fiber preform 10. Thus, even if the formation of the glass soot proceeds on the surface of the optical fiber preform 10 and the length of the optical fiber preform 10 in the vertical direction increases, the rotation and elevation mechanism 106 can pull up the optical fiber preform 10 at the timing when the length of the optical fiber preform 10 reach the desired pulling-up length in the reaction vessel 101.

Figure 6:
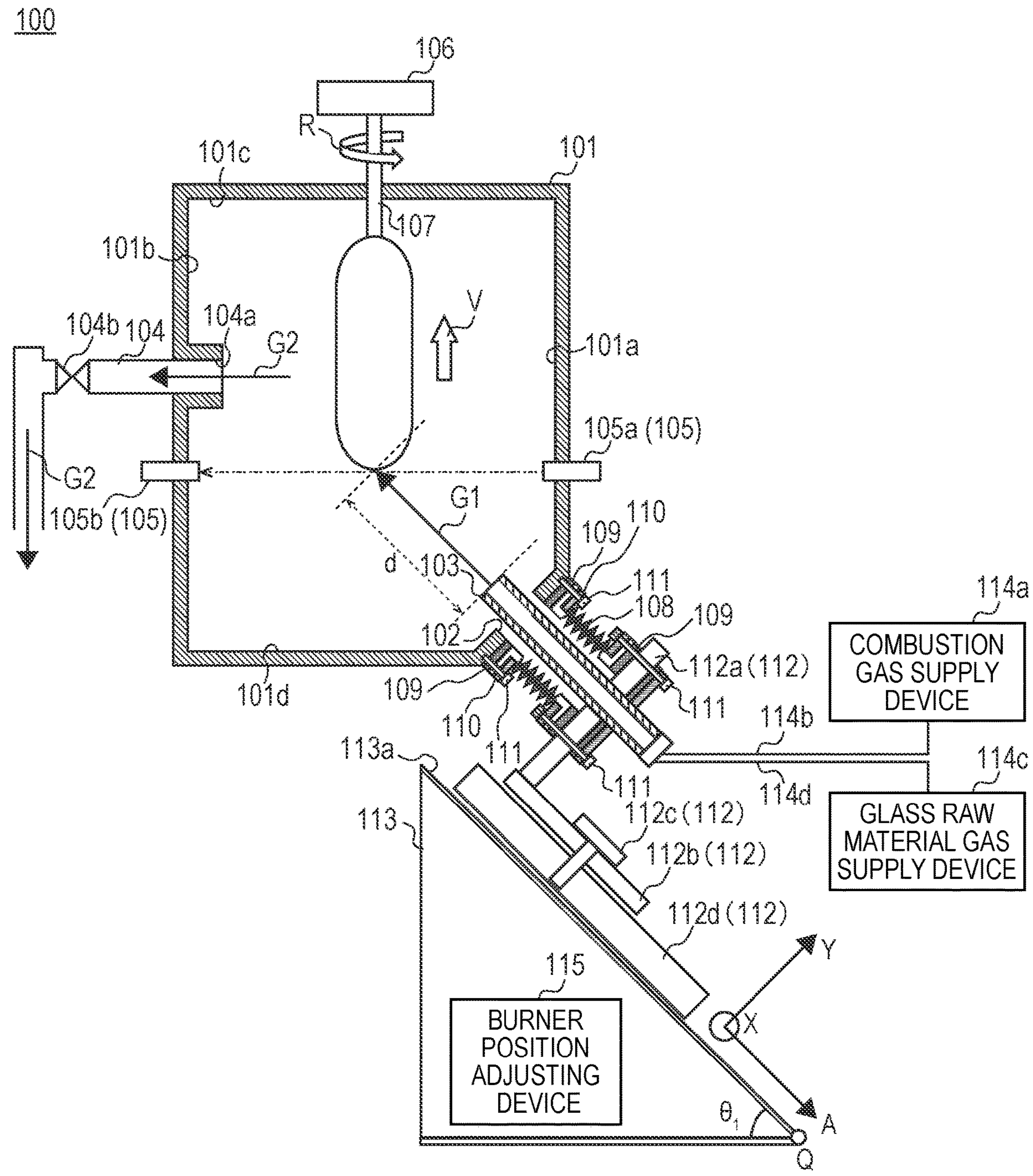
FIG. 6 is a schematic cross-sectional view illustrating the state of the optical fiber preform pulled up in the manufacturing apparatus according to the first embodiment.

FIG. 6 is a schematic cross-sectional view illustrating the state of the optical fiber preform 10 pulled up in the manufacturing apparatus 100. FIG. 6 illustrates the state of the optical fiber preform 10 pulled up in the vertical direction V along with the target rod 107 by the rotation and elevation mechanism 106 when the tip detection sensor 105 detects the tip (lowest end) of the optical fiber preform 10 due to the deposition of glass soot on the surface of the optical fiber preform 10. Thus, the distance between the tip of the optical fiber preform 10 and the gas discharge port of the burner 103 is kept at d.

In step S108, the control unit 200 finishes the glass soot formation process and the process ends. Specifically, the control unit 200 controls the combustion gas supply device 114*a* and the glass raw material gas supply device 114*c*. The combustion gas supply device 114*a* and the glass raw material gas supply device 114*c* stop the gas supply. The control unit 200 controls the rotation and elevation mechanism 106. The rotation and elevation mechanism 106 stops the rotation of the target rod 107. The rotation and elevation mechanism 106 then drives the target rod 107 to carry out the optical fiber preform 10 with the glass soot deposited on the surface from the reaction vessel 101.

As described above, the manufacturing apparatus 100 according to the present embodiment is provided with the sealing member 108 that is freely extendable according to the position and the angle of the burner 103, so that the problems of ensuring airtightness and complicated position adjustment of the burner 103 can be solved. That is, contamination to the optical fiber preform 10 can be prevented. As a result, the occurrence of defects such as disconnection can be avoided even when the optical fiber is drawn. Thereby, the effect that the optical fiber with a good refractive index distribution can be manufactured is achieved.

In addition, in the manufacturing apparatus 100 according to the present embodiment, the sealing member 108 includes at least the first connecting part connected to the opening 102 of the reaction vessel 101 and the second connecting part connected to the burner 103. Thus, the burner 103 can be securely connected to the reaction vessel 101 while maintaining the airtightness of the manufacturing apparatus 100.

In addition, the opening 102 of the reaction vessel 101 and the sealing member 108 are airtightly connected via the heat-resistant packing 109. This prevents thermal deformation of the heat-resistant packing 109 even when the inside of the reaction vessel becomes hot, thus maintaining airtightness.

The manufacturing apparatus 100 is further provided with the burner supporting member 112 for supporting the burner 103 on the outside of the reaction vessel 101, and the burner position adjustment device (adjustment mechanism) 115 for adjusting the distance from the burner 103 to the target rod (initial substrate) 107 and the angle of the burner 103 with respect to the target rod 107. Thus, the position and the angle of the burner 103 can be easily adjusted.

The burner position adjusting device 115 also adjusts angle of the burner 103 and the distance between the burner 103 and the target rod 107 by driving the burner supporting member 112. Thus, the position and angle of the burner 103 can be easily adjusted via the burner supporting member 112.

The burner position adjusting device 115 adjusts the angle of the burner 103 and the distance between the burner 103 and the target rod 107 based on the lot information of the optical fiber preform 10 to be manufactured. Thus, the burner 103 can spray the glass soot on the target rod 107 under the optimum conditions for each lot.

Also, the manufacturing apparatus 100 further includes the pedestal 113 with the inclined surface 113*a* on which the burner supporting member 112 is mounted. The burner position adjusting device 115 can adjust the distance from the gas discharge port of the burner 103 to the target rod 107 by driving the burner supporting member 112 along the inclined surface 113*a*.

Also, the burner position adjusting device 115 can adjust the angle of the burner 103 with respect to the target rod 107 by changing the angle of the inclined surface 113*a*. That is, the angle when the reaction gas is sprayed is changed. Thereby, the burner position adjusting device 115 can the angle of the burner 103 and the distance between the burner 103 and the target rod 107 accurately and easily.

Furthermore, the sealing member 108 is formed in a bellow-like shape in the longitudinal direction, so that the expansion and contraction are easy. Thereby, the position and angle of the burner 103 can be adjusted repeatedly.

The manufacturing apparatus 100 described in the above embodiment can also be configured as in the following second to fourth embodiment. Note that the symbols in common with those assigned in the figure of the first embodiment indicate the same object. Descriptions of the parts in common with the first embodiment are omitted, and the different parts are described in detail.

Second Embodiment

The present embodiment differs from the first embodiment in that the manufacturing apparatus 100 further has a function for adjusting the position and angle of the burner 103 even during the execution of the glass soot formation process.

Figure 7:
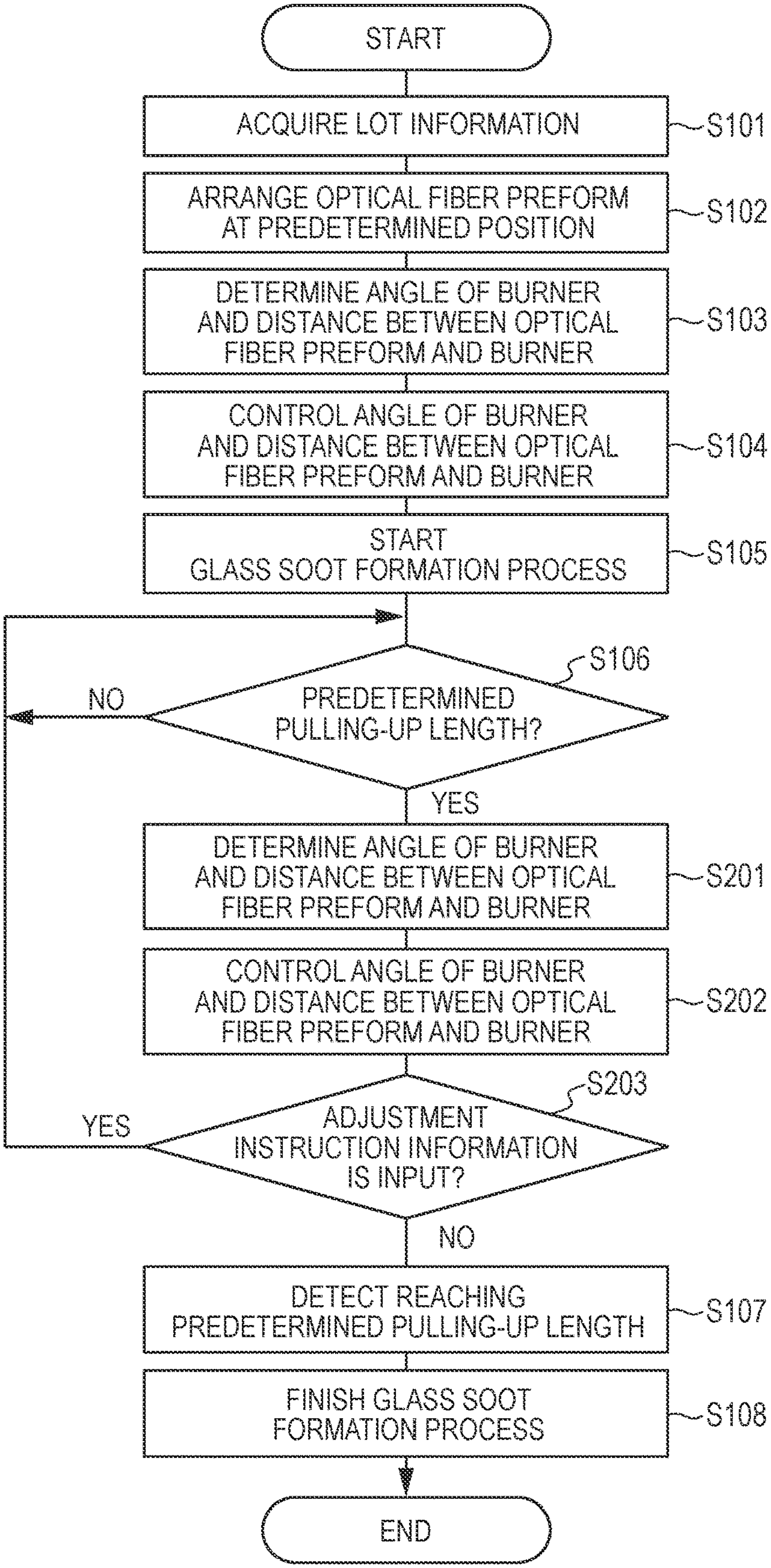
FIG. 7 is a flow chart illustrating an example of a process during the glass soot formation in the manufacturing apparatus according to a second embodiment.

FIG. 7 is a flow chart illustrating an example of a process during the glass soot formation in the manufacturing apparatus 100 according to the present embodiment. FIG. 7 differs from FIG. 4 described in the first embodiment only in a part of processing. The description of common processing is omitted below, and the differences are described in detail.

First, when the control unit 200 performs the processes of steps S101 to S106 as in FIG. 4, the process shifts to step S201.

In step S201, the control unit 200 refers to the manufacturing conditions stored in the ROM202 or RAM203 based on the elapsed time from the start time of the glass soot formation process, the size of the optical fiber preform 10 estimated from the elapsed time, or the like. Thereby, the control unit 200 determines the angle of the burner 103 and the distance between the optical fiber preform 10 and the burner 103.

Then, the control unit 200 controls the burner position adjusting device 115 based on the distance and angle information determined in step S201. The burner position adjusting device 115 adjusts the angle of the burner 103 and the distance between the optical fiber preform 10 and the burner 103 (step S202).

Next, the control unit 200 determines whether or not adjustment instruction information regarding the angle of the burner 103 and the distance between the optical fiber preform 10 and the burner 103 is input (step S203: YES).

Here, when the control unit 200 determines that the adjustment instruction information is input (step S203: YES), the process returns to the step S106.

On the other hand, when the control unit 200 determines that the adjustment instruction information is not input (step S203: NO), the process proceeds to the step S107. The processes after the step S107 are the same as that in FIG. 4.

In the flowchart of FIG. 7, the position and angle adjustment process of the burner 103 is continuously performed at the timing when the optical fiber preform 10 reaches the predetermined pulling-up length, but the process is not necessary to be continuously performed. For example, the pulling-up process of the optical fiber preform 10 and the position and angle adjustment process of the burner 103 may be performed at different timing or under different conditions in the glass soot formation process.

As described above, the manufacturing apparatus 100 according to the present embodiment can adjust the position and angle of the burner 103 even during the execution of the glass soot formation process. Therefore, in addition to the effect of the first embodiment, the position and angle of the burner 103 can be changed freely in accordance with the deposition state of the glass soot with respect to the optical fiber preform 10. The quality of the optical fiber preform 10 can be improved further.

Third Embodiment

The present embodiment differs from the second embodiment in that the manufacturing apparatus 100 further has a function that can switch, based on setting information, the position and angle adjustment process of the burner 103 during glass soot formation.

Figure 8:
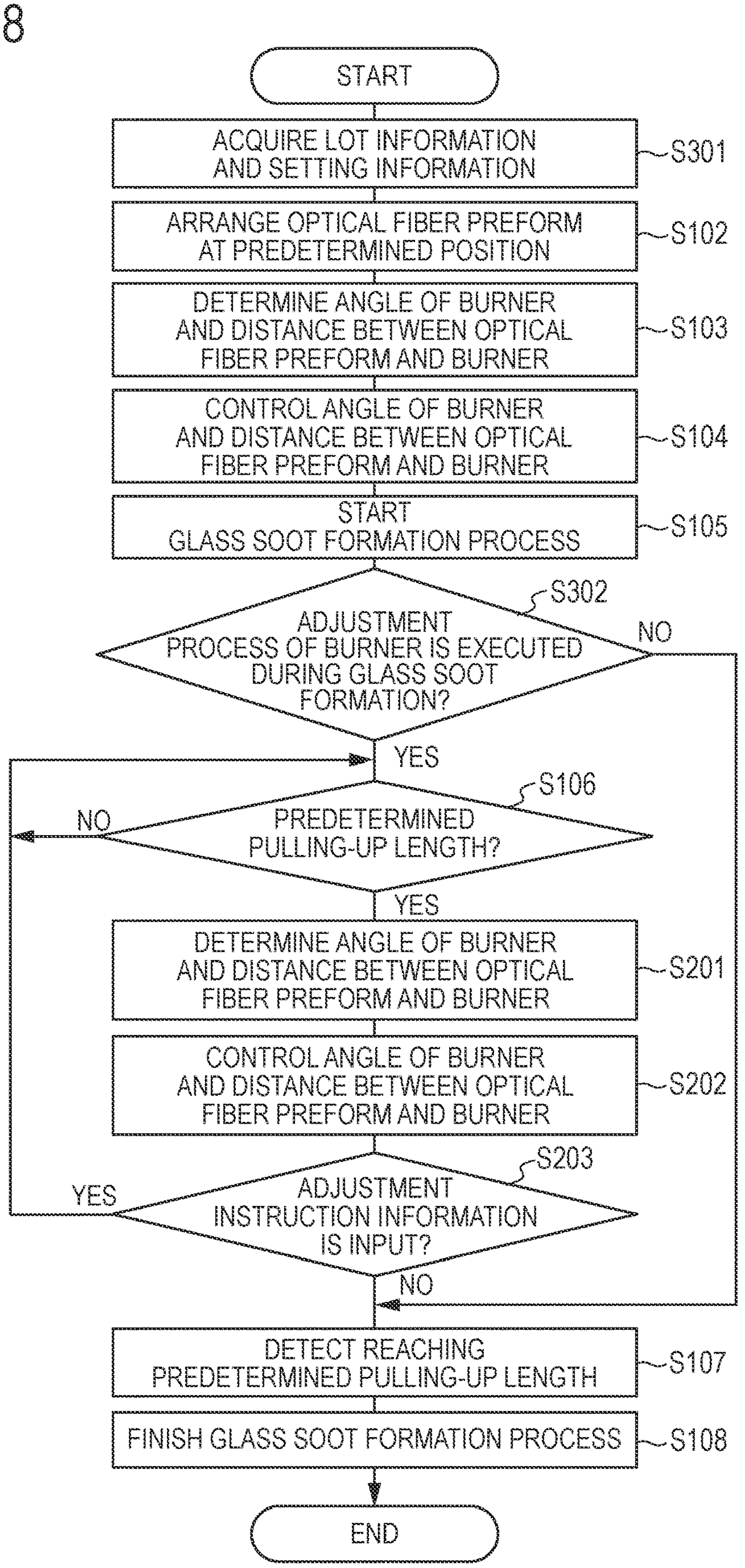
FIG. 8 is a flow chart illustrating an example of a process during the glass soot formation in the manufacturing apparatus according to a third embodiment.

FIG. 8 is a flowchart illustrating an example of a process during glass soot formation in the manufacturing apparatus 100 according to the present embodiment. FIG. 8 differs from FIG. 7 described in the second embodiment only in a part of processing. Descriptions of the common processing are omitted below, and the differences are described in detail.

First, the control unit 200 acquires lot information of the optical fiber preform 10 to be manufactured, which is input from the input operation unit 205, and setting information related to the position and angle adjustment process (step S301). Then, when the processes of steps S102 to S105 are performed as in FIG. 7, the process proceeds to step S302.

In step S302, the control unit 200 refers to the setting information acquired in step S301 and determines whether or not the adjustment process of the burner 103 should be executed during glass soot formation.

Here, when the control unit 200 determines that adjustment process of the burner 103 should be executed during glass soot formation (step S302: YES), the process proceeds to step S106. The processes of steps S106 to S203 is the same as that in FIG. 7.

On the other hand, when the control unit 200 determines that the adjustment process of the burner 103 should not be executed during the glass soot formation (step S302: NO), the process proceeds to step S107. The processes after the step S107 are the same as that in FIG. 7.

As described above, the burner position adjusting device 115 according to the present embodiment further has a function that can switch, based on the setting information, the position and angle adjustment process of the burner 103 during glass soot formation. Therefore, in addition to the effect of the second embodiment, the operator can freely select the execution mode of the position and angle adjustment process of the burner 103.

Fourth Embodiment

The present embodiment differs from the second embodiment in that the burner position adjusting device 115 further has the function of adjusting the angle of the burner 103 and the distance between the optical fiber preform 10 and the burner 103 based on an elapsed time. The elapsed time is the length of time that the burner 103 sprayed the glass soot against the target rod 107.

Figure 9:
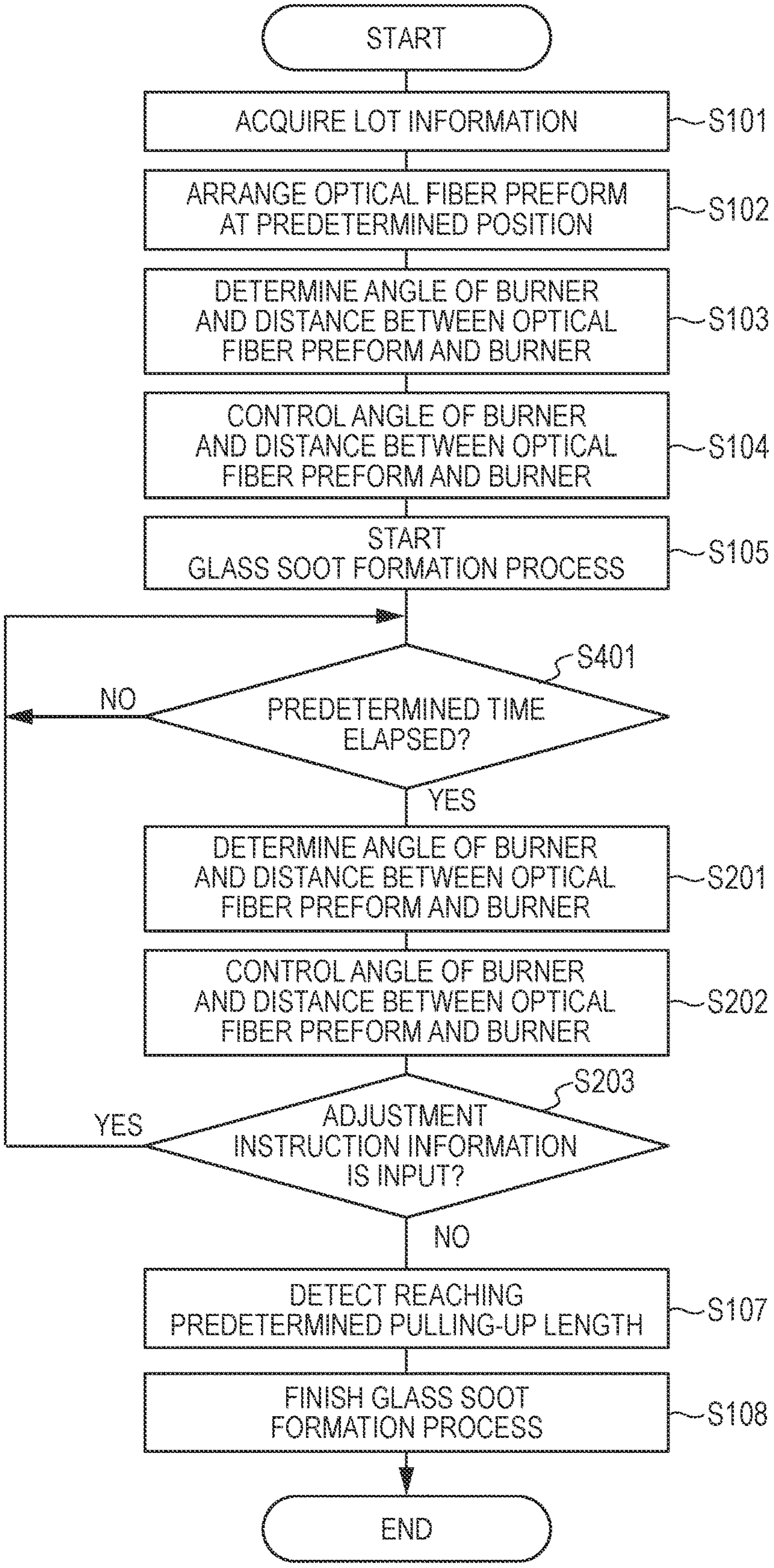
FIG. 9 is a flow chart illustrating an example of a process during the glass soot formation in the manufacturing apparatus according to a fourth embodiment.

FIG. 9 is a flow chart illustrating an example of a process during the glass soot formation in the manufacturing apparatus 100 according to the present embodiment. FIG. 9 differs from FIG. 7 described in the second embodiment only in a part of processing. Therefore, the description of common processing is omitted below, and the differences will be described in detail.

First, when the control unit 200 performs the processes of steps S101 to S105 as in FIG. 7, the process proceeds to step S401.

In step S401, the control unit 200 determines whether the elapsed time from the start of the glass soot formation process has reached a predetermined time. Here, when the control unit 200 determines that the elapsed time has reached the predetermined time (step S401: YES), the process proceeds to step S201. The processes in steps S201 to S203 are the same as those in FIG. 7.

On the other hand, when the control unit 200 determines that the elapsed time has not reached the predetermined time (step S401: NO), the glass soot formation process is continued under the same conditions until the elapsed time reaches the predetermined time.

As described above, the manufacturing apparatus 100 according to the present embodiment further has the function that the burner position adjusting device 115 adjusts the angle of the burner 103 and the distance between the optical fiber preform 10 and the burner 103 based on the elapsed time from the start time of the glass soot formation process. Therefore, in addition to the effect of the second embodiment, the position of the tip of the optical fiber preform 10 in the reaction vessel 101 can be estimated based on the length of the elapsed time even when the tip detection sensor 105 is not provided. Thereby, the angle of the burner 103 and the distance between the optical fiber preform 10 and the burner 103 can be controlled.

Note that all the embodiments described above are to simply illustrate embodied examples in implementing the present invention, and the technical scope of the present invention should not be construed in a limiting sense by those embodiments. That is, the present invention can be implemented in various forms without departing from the technical concept or the primary feature thereof.

Variant Embodiment

In the embodiments described above, a configuration in which one burner 103 is provided in one manufacturing apparatus 100 is described, but the number of burners 103 is not limited to one, and multiple burners may be used. In this case, at least one burner 103 among the multiple burners 103 may be configured to adjust the angle of the burner 103 and the distance between the burner 103 and the optical fiber preform 10.

In the embodiments described above, the burner 103 is configured to be movable in two directions, i.e., the A-direction and the Y-direction, but it may be further configured to be movable in the horizontal direction (In the figure, the X-direction perpendicular to the A-direction and Y-directions). Moreover, the structure for changing the inclined surface 113*a* is not limited to the structure described above.

Also, in the embodiments described above, the case where the manufacturing apparatus 100 is a vertical type is described, but the manufacturing apparatus 100 to which the present invention can be applied is not limited to the vertical type, but may be a horizontal type.

In the embodiments described above, the configuration for automatically adjusting the position and angle of the burner 103 when the optical fiber preform 10 by the tip detection sensor 105 reaches a predetermined pulling-up length or when the elapsed time from the start of the glass soot formation process reaches a predetermined time is explained. However, the configuration may allow the operator to manually adjust the position and angle of the burner 103, or the configuration may perform the position and angle adjustment of the burner 103 based on conditions other than the detection signal of the tip of the optical fiber preform 10 or the elapsed time length.

For example, the manufacturing apparatus 100 may be further equipped with a ranging sensor that measures the distance from the burner 103 to the optical fiber preform 10. In this case, the control unit 200 can adjust the position and angle of the burner 103 based on the detection signal of the distance measured by the ranging sensor.

Furthermore, the manufacturing apparatus 100 may combine the first condition for detecting the tip of the optical fiber preform 10 by the tip detection sensor 105 and the second condition for the elapsed time since the glass soot formation process was started. Thereby, the manufacturing apparatus 100 may automatically adjust the angle of the burner 103 and the distance between the optical fiber preform 10 and the burner 103.

What is claimed is:

1. An apparatus for manufacturing an optical fiber preform, the apparatus comprising:

a reaction vessel in which an initial substrate is arranged;

a burner that can be inserted from an opening of the reaction vessel to spray a glass soot on the initial substrate in the reaction vessel;

a sealing member that has an internal space for accommodating the burner, and is extendable in accordance with a position of the burner and airtightly connects the opening and the internal space; and a burner supporting member that is provided outside the reaction vessel and supports the burner, wherein the sealing member comprises at least a first connecting part connecting with the opening and a second connecting part connecting with the burner, wherein the opening and the first connecting part are airtightly connected via a first heat-resistant packing material, wherein the burner and the second connecting part are airtightly connected via a second heat-resistant packing material, wherein the second connecting part is connected to the burner via the burner supporting member, and wherein the sealing member is extendable and contractible in accordance with movement of the burner supporting member such that airtightness in the reaction vessel is maintained while the burner is moved.

2. The apparatus for manufacturing the optical fiber preform according to claim 1, further comprising:

an adjustment mechanism that adjusts a distance between the burner and the initial substrate and an angle of the burner with respect to the initial substrate.

3. The apparatus for manufacturing the optical fiber preform according to claim 2, wherein the adjustment mechanism adjusts the distance and the angle of the burner by driving the burner supporting member.

4. The apparatus for manufacturing the optical fiber preform according to claim 3, wherein the adjustment mechanism adjusts the distance and the angle of the burner based on length of time when the glass soot is sprayed against the initial substrate.

5. The apparatus for manufacturing the optical fiber preform according to claim 3, wherein the adjustment mechanism adjusts the distance and the angle of the burner based on lot information of the optical fiber preform to be manufactured.

6. The apparatus for manufacturing the optical fiber preform according to claim 3, further comprising:

a pedestal that has an inclined surface on which the burner support member is mounted, and wherein the adjustment mechanism adjusts the distance by driving the burner support member along the inclined surface and adjusts the angle of the burner by changing an angle of the inclined surface.

7. The apparatus for manufacturing the optical fiber preform according to claim 1, wherein the sealing member is formed in a bellow-like shape in a longitudinal direction.

* * * * *